United States Patent
Ohle et al.

(10) Patent No.: US 6,768,966 B2
(45) Date of Patent: Jul. 27, 2004

(54) METHOD FOR STORING ODOMETER DATA

(75) Inventors: Jörn-Marten Ohle, Leonberg (DE); Martin Rahm, Stuttgart (DE); Eckard Unseld, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 45 days.

(21) Appl. No.: 10/212,148

(22) Filed: Aug. 6, 2002

(65) Prior Publication Data

US 2003/0055599 A1 Mar. 20, 2003

(30) Foreign Application Priority Data

Aug. 7, 2001 (DE) .......................................... 101 38 703

(51) Int. Cl.[7] .......................... G01C 22/00; G01F 15/20; B60R 25/10
(52) U.S. Cl. .......................... 702/165; 340/5.65; 701/35
(58) Field of Search .......................... 702/96, 150, 158, 702/163, 165; 235/95, 96; 701/7, 35, 207, 213, 214; 377/24.1, 26; 340/5.22, 5.65, 426.1, 426.28, 438

(56) References Cited

U.S. PATENT DOCUMENTS

| | | | |
|---|---|---|---|
| 4,366,466 A | * 12/1982 | Lutz | 340/5.65 |
| 4,710,888 A | 12/1987 | Burke et al. | 702/165 |
| 4,803,707 A | 2/1989 | Cordan, Jr. | 377/24.1 |
| 4,930,094 A | * 5/1990 | Luitje et al. | 702/165 |
| 6,519,516 B2 | * 2/2003 | Pfaeffle et al. | 701/35 |

FOREIGN PATENT DOCUMENTS

DE 198 21 696 11/1999

OTHER PUBLICATIONS

English Language Abstract of Japanese Publication No. 06241825, Sep. 2, 1994.

* cited by examiner

Primary Examiner—John Barlow
Assistant Examiner—John Le
(74) Attorney, Agent, or Firm—Crowell & Moring LLP

(57) ABSTRACT

A method for storing odometer reading data in a vehicle having control units which are connected via a data bus. The odometer reading data, which is determined at a particular time by an odometer, is stored in a storage means of a first control unit. This provides an alternative method for tamper-proof storage of odometer reading data and, in particular, improved protection against errors during the transmission of the odometer reading data. The current odometer reading data of at least one further control unit is then stored on the data bus in a storage means. The control units transmit the odometer reading data, which is stored at a particular time, onto the data bus at specific time intervals, and a control unit accepts the odometer reading transmitted onto the data bus if that reading is higher than its stored value, and uses that value for the further counting and storage in the particular control unit.

13 Claims, 1 Drawing Sheet

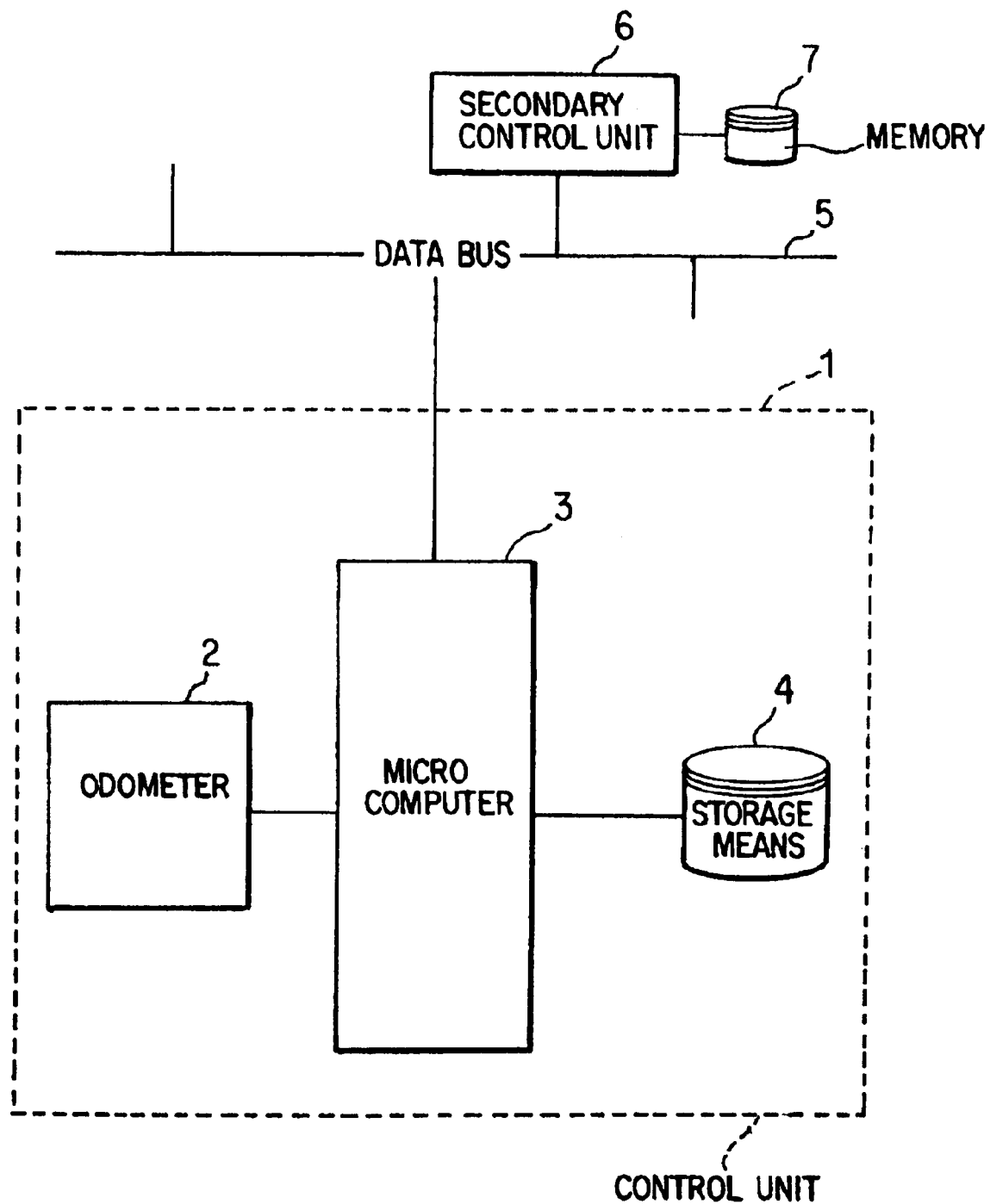

METHOD FOR STORING ODOMETER DATA

This application claims the priority of German Application No. 101 38 703.2, filed Aug. 7, 2001, the disclosure of which is expressly incorporated by reference herein.

BACKGROUND AND SUMMARY OF THE INVENTION

The invention relates to a method for the tamper-proof storage of the odometer reading in a vehicle.

The tamper-proof storage of a distance covered by a vehicle is very important. Recently, insurance companies have attempted to make their premiums for vehicles dependent on the distance which they travel annually. In addition, the odometer reading is a decisive factor in determining the price when a secondhand car is bought or sold.

U.S. Pat. No. 4,710,888 discloses a method for measuring, displaying and storing the distance covered by a vehicle, in which the accumulated and updated odometer reading data is stored in a nonvolatile memory. An essential feature of the method is the optimized addressing for the storage of the accumulated odometer reading data in the nonvolatile memory in order to avoid unnecessary writing/deletion access operations to the nonvolatile memory. In addition, the method which is used when writing to the nonvolatile memory permits checking for faults to be carried out by setting and comparing an additional parity bit for each stored data value.

U.S. Pat. No. 4,803,707 discloses a circuit for digitally storing odometer reading data, which is intended to increase the service life of the nonvolatile memory. Here, the significant digital value of an odometer reading is set as an address pointer for the nonvolatile memory in which the non-significant digital value of the odometer reading is then stored. In addition, electronic tampering with odometer reading data is prevented in that, during writing, an additional flag is set which cannot be deleted and is additionally checked.

German Patent No. DE 19821696 discloses a method and a device for the tamper-proof storage of odometer reading data of a vehicle. Here, the data which is determined by a counting unit is transmitted in encrypted form to a receiver unit. In the receiver unit the data is encrypted and stored.

Japanese Patent No. 06241825 A discloses an electronic odometer in which the respective reading is stored in a non-volatile memory and also in a processor part and a display part. In order to prevent misuse, when the non-volatile memory is tampered with at the start of the process part the odometer reading information contained there is written back into the non-volatile memory.

The object of the present invention is to make available an alternative method for the tamper-proof storage of odometer reading data. Here in particular the protection against errors during the transmission of the odometer data is improved.

The object is achieved according to the invention by storing the current odometer reading data of at least one further control unit on the data bus in a memory. The control units transmit the odometer reading data, which is stored at a particular time, onto the data bus at specific time intervals. A control unit accepts the odometer reading transmitted onto the data bus only if the reading is higher in value than its stored value. This value is used by the control unit for the further counting and storage.

The redundant storage of the odometer reading data in the further control units enhances the protection against tampering. Possible tampering would then have to be carried out not only in the first control unit but also in the further control units.

As tampering with the odometer reading data generally has the objective of reducing the odometer reading data, the method ensures that the odometer reading, having the highest value transmitted on the data bus, is always stored by the storage means of the control units. In this way, when tampering which occurs with the odometer reading data at one of the control units, this tampering is prevented from being spread to the other control units.

In addition, when a control unit is changed it is not necessary to reset the odometer reading. The correct value is automatically accepted by the new control unit when this method is applied.

In a further development of the method according to the invention, before the acceptance of the odometer reading data, the odometer reading data transmitted on the data bus is checked for errors by a control unit. This step is necessary, as there are a large number of error sources. For example, as a result of the incorrect behaviour of a controller or as a result of a software error or hardware fault in a control unit, incorrect data can get onto the data bus which could be interpreted as odometer reading data. This would lead to a situation in which a single error on the data bus system would "age" the means of transport by a random number of miles or kilometers. In addition, the odometer reading data on the data bus could also be tampered with intentionally because, of course, the data format of the data to be transmitted is known.

The acceptance of a relatively high odometer reading by a control unit is highly significant as this value is used for the further counting. Owing to the possible errors which can occur, it is necessary to ensure that only correct odometer reading data is accepted by the control units. This is achieved by checking the odometer reading data before acceptance by the control unit.

There are various ways of advantageously configuring and developing the teaching of the present invention. In this respect, reference is made, on the one hand, to the subordinate claims and, on the other, to the following explanation of an embodiment.

Other objects, advantages and novel features of the present invention will become apparent from the following detailed description of the invention when considered in conjunction with the accompanying drawings.

BRIEF DESCRIPTION OF THE DRAWINGS

An embodiment according to the invention is illustrated in the drawing wherein:

FIG. 1 shows a device for carrying out the method according to the invention.

DETAILED DESCRIPTION OF THE PREFERRED EMBODIMENT

A data bus 5 of a vehicle to which a primary control unit 1 and a secondary control unit 6 for carrying out the method according to the invention are connected is illustrated schematically in FIG. 1. In the vehicle, the primary control unit 1 is connected directly to the instrument cluster for displaying and measuring the odometer reading, while the secondary control unit 6 is implemented as a stand-alone control unit.

The primary control unit 1 is electrically connected to an odometer 2, a microcomputer 3 and a non-volatile storage means 4. The control unit 1 receives the current odometer measurement by way of the odometer 2. By means of the microcomputer 3, the distance which is determined is summed to form the odometer reading data stored in the storage means 4, and is stored and transmitted onto the data bus 5 in specific time periods. When an odometer reading is transmitted, the message counter for the transmission of the odometer reading is always incremented by one and stored in the storage means 4. The code word is implemented by a uniquely defined four-byte-long number which is defined by the manufacturer and is also stored in the storage means 4.

In the exemplary embodiment, the data bus system is a CAN bus, but the method can be applied with any other bus system such as MOST or, FlexRay. In the CAN protocol it a message is, in principle, structured as follows: "start of the message" designates the beginning of the message, "message identifier" contains the identifier for distinguishing the messages, the "check field" contains the code for the number of data bytes in the "data field", the "data field" contains the data to be transmitted, the "CRC field" contains a frame protection word for detecting transmission faults, "reception confirmation" contains a confirmation signal of all the receivers which have received the message without errors and "end of message" marks the end of the message.

The "data field" which is transmitted onto the data bus by the microcomputer 3 and has the length of eight bytes contains, in precisely this order: the code word of the vehicle with a length of 4 bytes, the message counter with a length of 1 byte and the actual odometer reading with a length of 3 bytes.

The odometer reading data which is transmitted by the primary control unit 1 is evaluated by a secondary control unit 6. The secondary control unit 6 also has a non-volatile memory 7 in which its current odometer reading, its message counter, and the identification code of the vehicle are stored.

The storage means 4 and the non-volatile memory 7 are each implemented as non-volatile storage means as it is necessary to ensure that the current odometer reading data is available after the vehicle has been switched off and started again.

If the transmitted odometer reading data of the primary control unit 1 is higher than the odometer reading data stored in the storage means 7 of the control unit 6, the control unit 6 carries out checking of the "data field" contained in the message of the data bus. The "data field" contains, as stated above: the code word, the message counter and the current odometer reading. The code word of the transmitted message is first compared with the value stored on the memory 7 of the control unit 6. From the correspondence, the difference in distance of the odometer readings transmitted in three successive time periods is formed. If this difference in distance is not greater than a distance which is characteristic of the vehicle and if the message counter has been correctly incremented for the odometer reading data in question, the higher odometer reading is accepted as the current odometer reading from the secondary control unit 6. The secondary control unit 6 stores the higher reading in the non-volatile storage means and accepts it as a value for the rest of the counting procedure.

The message counter can also be embodied as a circulating counter with limited counting range whose counting starts again at zero when an overflow occurs. It is to be emphasized that errors in the transmitting control means are detected by the message counter.

In specific time periods, the secondary control unit 6 transmits onto the data bus its currently stored odometer reading data in the same format, i.e. with a code word, updated message counter and its current odometer reading.

The primary control unit 1 evaluates the transmitted odometer reading data by using the same method steps as the secondary control unit 6. If the odometer reading transmitted by the secondary control unit 6 is higher than that of the primary control unit 1 and if the conditions already described above are fulfilled, the odometer reading on the primary control unit 1 has been tampered or the primary control unit has a technical defect. The primary control unit 1 then accepts the odometer reading of the secondary control unit 6 as a starting value for the rest of the determination of the odometer reading.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for storing odometer reading data in a vehicle having at least two control units which are each connected via a data bus, wherein the odometer reading data, which is determined at a particular time by means of an odometers is stored in a first storage means of a first one of said at least two control units, said method comprising the steps of:

storing the current odometer reading data of at least a second one of said at least two control units on the data bus in a second storage means, transmitting by at least one of two control units, the odometer reading data, which is stored at a particular time, onto the data bus at specific time intervals, and accepting in one of said control units, the odometer reading transmitted onto the data bus if said reading is higher in value than a stored value, and using said value for the further counting and storage in said one control unit.

2. The method according to claim 1, wherein, before the acceptance of the odometer reading data, the odometer reading data transmitted on the data bus is checked for errors by one of said control units.

3. The method according to claim 2, wherein the odometer reading transmitted on the data bus is accepted only if a code word of the transmitted odometer reading is identical to a code word of the vehicle.

4. The method according to claim 2, wherein the odometer reading transmitted on the data bus is accepted only if a message counter of the transmitted odometer reading is incremented in a predetermined manner over a plurality of successive time periods.

5. The method according to claim 2, wherein the odometer reading which is transmitted on the data bus is accepted only if the difference between the odometer readings transmitted in a plurality of successive time periods does not exceed a predetermined distance which is characteristic of the vehicle.

6. The method according to claim 1, wherein the odometer reading which is transmitted on the data bus is accepted only if the difference between the odometer readings transmitted in a plurality of successive time periods does not exceed a predetermined distance which is characteristic of the vehicle.

7. The method according to claim 6, wherein the odometer reading transmitted on the data bus is accepted only if a code word of the transmitted odometer reading is identical to a code word of the vehicle.

8. The method according to claim 6, wherein the odometer reading transmitted on the data bus is accepted only if a message counter of the transmitted odometer reading is incremented in a predetermined manner over a plurality of successive time periods.

9. The method according to claim 1, wherein, when it is transmitted, the odometer reading data is supplemented with a code word which is uniquely defined for the vehicle, in order to ensure that the message has been transmitted by one of said units.

10. The method according to claim 9, wherein the odometer reading transmitted on the data bus is accepted only if a code word of the transmitted odometer reading is identical to a code word of the vehicle.

11. The method according to claim 9, wherein the odometer reading transmitted on the data bus is accepted only if a message counter of the transmitted odometer reading is incremented in a predetermined manner over a plurality of successive time periods.

12. The method according to claim 1, wherein, when it is transmitted, the odometer reading data is supplemented with a message counter whose value is a counter for the number of transmitted odometer reading data items of one of said control units.

13. The method according to claim 12, wherein the odometer reading transmitted on the data bus is accepted only if a message counter of the transmitted odometer reading is incremented in a predetermined manner over a plurality of successive time periods.

* * * * *